Nov. 24, 1931.   H. D. MULLAN ET AL   1,833,224
MECHANICAL MOVEMENT
Filed July 22, 1929   5 Sheets-Sheet 1

INVENTORS
Harry D. Mullan & Charles W. Tingley
BY Wheeler, Wheeler & Wheeler
ATTORNEYS.

Nov. 24, 1931.  H. D. MULLAN ET AL  1,833,224
MECHANICAL MOVEMENT
Filed July 22, 1929  5 Sheets-Sheet 3
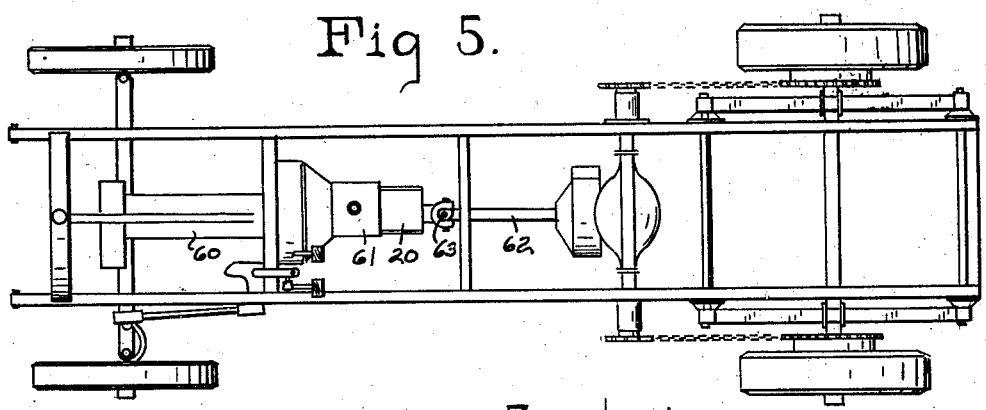
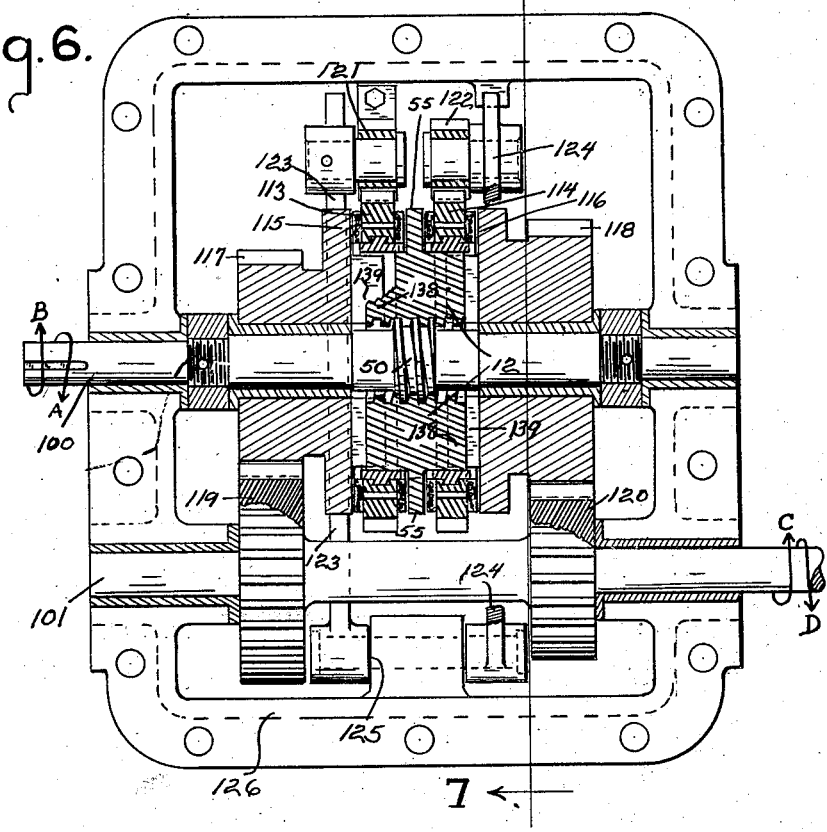
INVENTORS
Harry N. Mullan & Charles W. Tingley
BY Wheeler, Wheeler & Wheeler
ATTORNEYS.

Nov. 24, 1931.   H. D. MULLAN ET AL   1,833,224
MECHANICAL MOVEMENT
Filed July 22, 1929   5 Sheets-Sheet 4
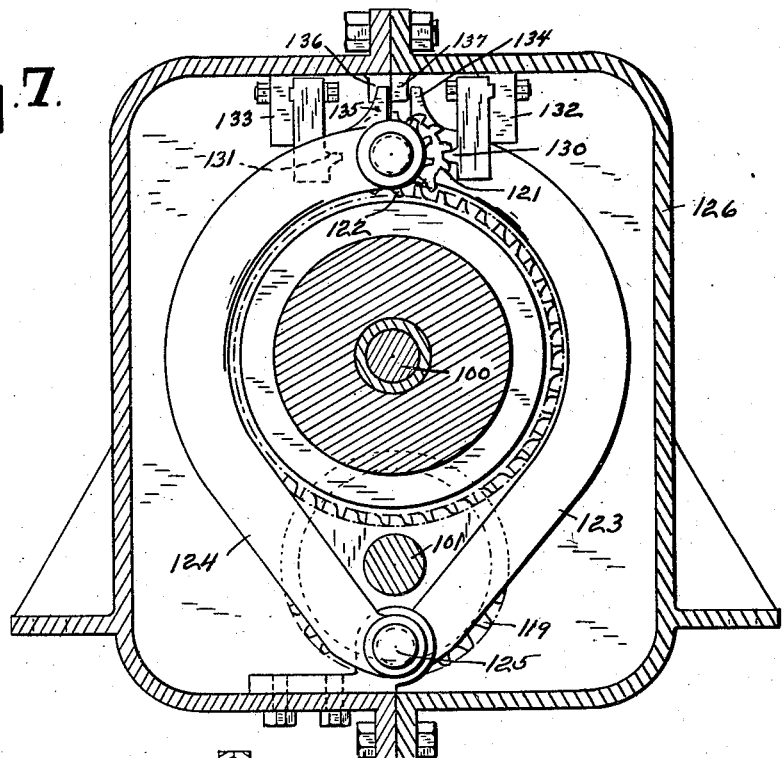
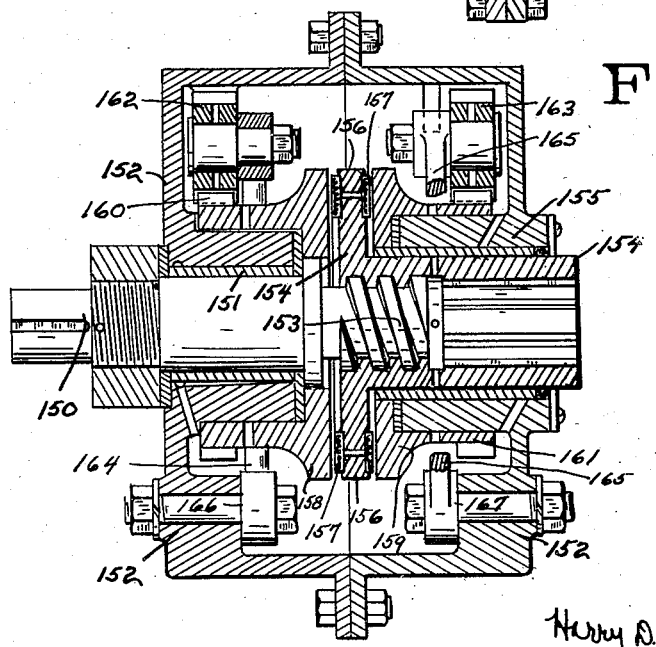
INVENTORS.
Harry D. Mullan & Charles W. Tingley
BY
Wheeler, Wheeler & Wheeler
ATTORNEYS.

Nov. 24, 1931. H. D. MULLAN ET AL  1,833,224
MECHANICAL MOVEMENT
Filed July 22, 1929  5 Sheets-Sheet 5

INVENTORS
Harry D. Mullan & Charles W. Tingley
BY Wheeler, Wheeler & Wheeler
ATTORNEYS.

Patented Nov. 24, 1931

1,833,224

UNITED STATES PATENT OFFICE

HARRY D. MULLAN AND CHARLES W. TINGLEY, OF MILWAUKEE, WISCONSIN; SAID MULLAN ASSIGNOR TO SAID TINGLEY

MECHANICAL MOVEMENT

Application filed July 22, 1929. Serial No. 379,971.

This invention relates to mechanical movements.

It is an object of this invention to provide a device designed to permit power to be delivered to a shaft in either direction of rotation and to prevent such rotation when power is not being so delivered.

It is a further object to provide a device of the character noted which will permit the shaft to rotate when the source of power is disconnected therefrom.

Still another object is to provide for an automobile a device incorporated in the power line shaft and adapted to act as an automatic break rendered operative when the engine is retarding the automobile and inoperative when the engine is propelling the automobile.

In the drawings:

Figure 5 is a view illustrating the device embodied in an automobile.

Figure 6 is a view partly in section showing a modified form of the invention.

Figure 7 is a sectional view taken on the line 7—7 of Figure 6.

Figure 8 is a sectional view of still another embodiment of this invention.

Throughout the specification like parts in the drawings are referred to by the same numerals.

Figure 1:
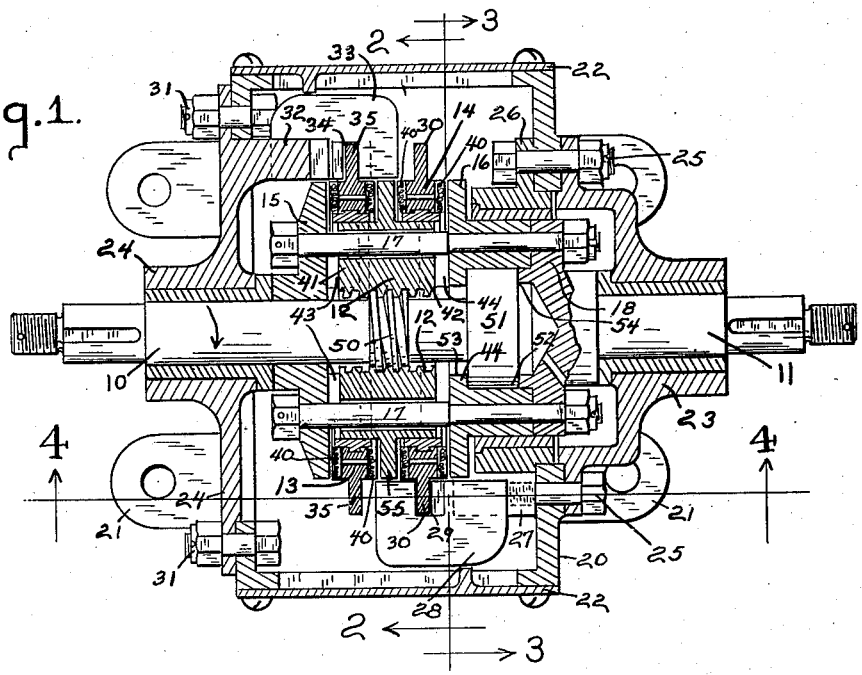
Figure 1 is a horizontal sectional view taken on the line 1—1 of Figure 2 of a device embodying the invention disclosed herein.
Figure 2:
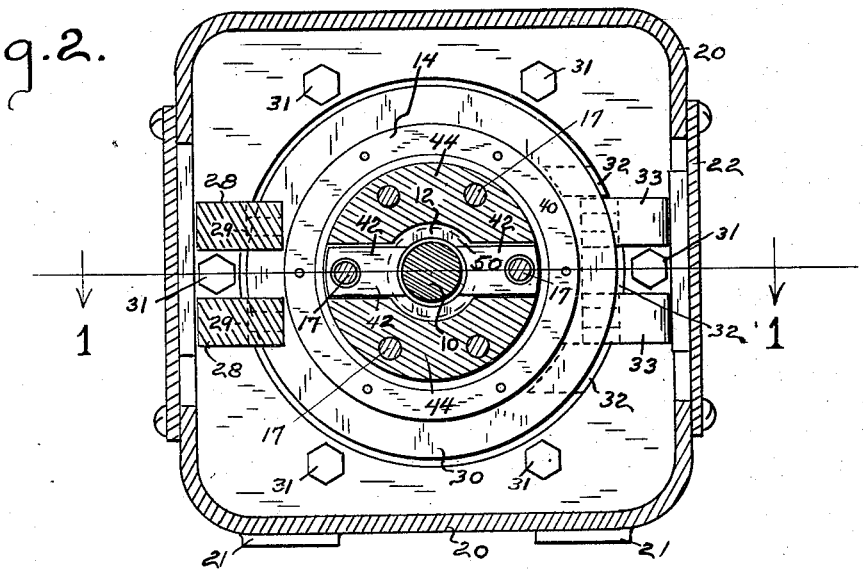
Figure 2 is a vertical sectional view taken on the line 2—2 of Figure 1.
Figure 3:
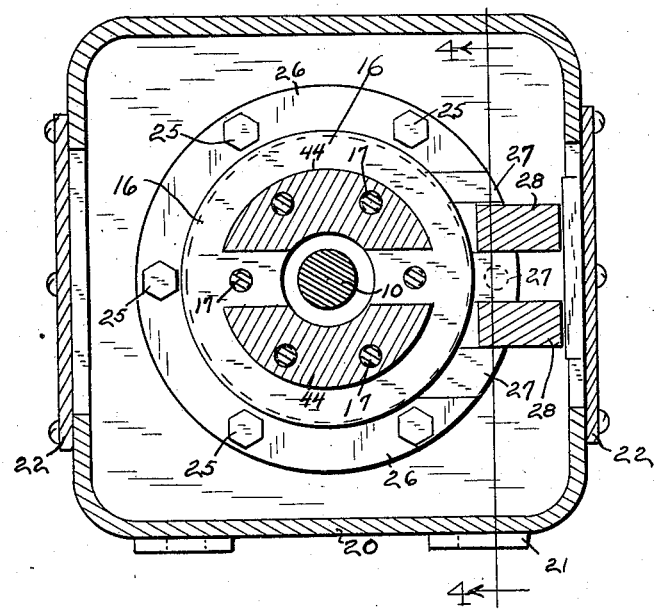
Figure 3 is a vertical sectional view taken on the line 3—3 of Figure 1, the view being in the opposite direction to that of Figure 2.

The design of the automatic two way lock disclosed in Figures 1 to 4 inclusive, is such that power may be transferred from the driving shaft 10 to the driven shaft 11 in axial alignment therewith, through the friction plate nut 12 which will clamp either of the friction rings 13 and 14 to their respective friction discs 15 and 16 each of which is secured to the driven shaft 11 by means of bolts 17 passing loosely through the nut 12 and secured to the flange 18 on the latter shaft.

Surrounding the nut, rings, and discs, is a casing 20 provided with feet 21 and removable plates 22. The casing is provided with shaft bearings 23 and 24. The bearing 23 is secured to the casing by bolts 25 which also engage the bearing member 26 for the friction disc 16. Bearing member 26 carries lugs 27 which are spaced apart to receive the dogs 28. Dogs 28 are slotted at 29 to receive the annular flange 30 on the friction ring 14. Bearing 24 is secured to the casing by bolts 31 and is provided with lugs 32 spaced apart to receive dogs 33 having slots 34 receiving the annular flange 35 on the friction ring 13. Friction rings 13 and 14 are each provided upon opposite faces with suitable facing material 40 such as leather.

As previously noted the bolts 17 hold the nut 12, plates 15 and 16, and shaft 11 in substantially axial alignment. However, to more firmly secure these elements against relative rotation, lugs 41 and 42 are provided on the nut 12 engaging lugs 43 and 44, respectively, on the discs 15 and 16. The lugs 41 and 44 and the bolts 17 permit free movement of the nut axially of the shaft 10 when the latter through threads 50 causes the nut to so move. As will be noted the shaft 10 is provided with an enlarged end 51 disposed in the hollow hub 52 of the friction disc 16. The enlarged end 51 is disposed between the annular shoulder 53 and the end 54 of shaft 11 and is free to rotate with the shaft 10 relative to the shaft 11.

Figure 4:
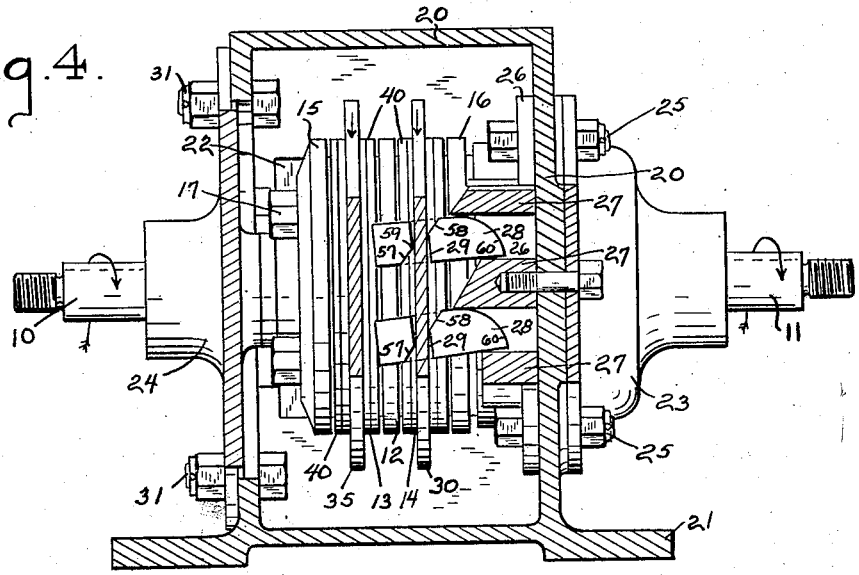
Figure 4 is a sectional view taken on the line 4—4 of Figure 3.

Assuming that the shaft 10 is being rotated by a source of power in the direction indicated by the arrow in Figures 1 and 4 and that the shaft 11 is connected with a power receiving mechanism, then the line resistance in the shaft 11 will tend to hold it against rotation. Consequently, the nut 12 will be held by the shaft 11 and the rotation of the shaft 10 will through threads 50 cause the nut to travel toward the friction disk 15. When the friction flange 55 on the nut 12 has clamped the friction ring 13 to the friction disc 15, the nut 12 will be interlocked with the shaft 10 and transmit the motion thereof to the shaft 11.

As previously noted the flange 35 on the friction ring 13 passes through slots 34 in the dogs 33. These slots are cut similarly to the slots 29 in the dogs 28 with the exception that they are arranged in opposition to the latter. As shown in Figure 4 the dogs 28 are provided with slots which have spaced substantially parallel sides terminating in angularly disposed faces 57 and 58 which are disposed in different planes adapting the shoulders 59 to bite the flange 30 when rotated as indicated by the arrow. On the other hand when the flange is rotated in the opposite direction the parallel faces of the slots 29 will prevent the dogs from engaging therewith. The ends of the dogs disposed between the lugs 27 are preferable rounded as shown at 60 to permit free engagement of the dogs with the flange 30.

As previously mentioned, the dogs 33 are the same as the dogs 28 except that they permit the flange 35 to rotate as indicated by the arrow in Figure 4 and grip the flange to prevent its rotation in the opposite direction. Thus when the shaft 10 is stationary and the load on the shaft 11 tends to rotate it in opposition to the arrow on shaft 10, shaft 11 will be held through bolts 17, lugs 42, nut 12, friction ring 13, friction plate 15, and dogs 33, against the aforesaid rotation.

Supposing now, the shaft 10 is rotating in opposition to the arrow in Figure 1 and the shaft 11 is being held stationary by a load thereon, then the thread 50 on the shaft 10 will cause the nut 12 to move toward the friction plate 16 and clamp the friction ring 14 thereto. Further rotation of the shaft 10 will through the nut 12, ring 14, and plate 16 rotate the shaft 11. When the shaft 10 is not delivering power to the shaft 11 and the latter tends to rotate in the opposite direction to that just described, the dogs 28 will engage the flange 30 as previously described and hold the shaft 11 against rotation.

From the foregoing it is apparent that if the shaft 10 is held stationary and the shaft 11 tends to rotate in either direction, it will be held against such rotation by appropriate dogs 33 or 28 operating as previously described.

Another feature of this invention is found in the fact that if the shaft 10 is rotating and the shaft 11 tends to over-run the shaft 10, the nut 12 will be moved accordingly to engage one of the friction plates which will act as a brake retarding the rotation of shaft 11. For instance, supposing the shaft 10 is rotating as indicated in Figure 1 and the shaft 11 tends to move at a faster rate than shaft 10, then the nut 12 will be turned about shaft 11 and caused to move toward friction disc 16. When the friction disc is thus engaged the friction ring 14 will act as a brake band permitting the shaft 11 to rotate only at the speed of the shaft 10.

Figure 5 shows the device just described as applied to an automobile. The power shaft 10 is connected with the engine 60 through the tranmission 61 and the driven shaft 11 is connected with the propeller shaft 62 through the universal 63. From the foregoing description it will be obvious that when the engine 60 has decreased its speed, it will through shaft 10 cause the nut 12 to engage one of the rings 13 or 14 with its cooperating friction disc 15 or 16. In this manner the propeller shaft 62 will be retarded and the speed of the automobile decreased. On the other hand, if the engine 60 is idle, it will through the shaft 10 cause the device disclosed herein to lock the propeller shaft 62 against rotation in either direction unless the engine 60 is actually propelling the shaft 62.

The advantage of having a device embodying this invention incorporated in an automobile lies in the fact that the automobile speed may be automatically controlled by merely regulating the flow of the explosive mixture to the engine, the device referred to acting as an automatic brake. Another advantageous feature is that the automobile may be parked on an incline and will remain stationary as long as the engine is idle. Then too, it may happen that while driving up or down a hill, the engine may stall or the car be otherwise uncontrollable. In either case the device disclosed herein will automatically stop the progress of the automobile if the engine is stopped. An automobile embodying this invention is under positive control at all times, such control being derived by the manipulation of the foot accelerator or hand throttle.

While we have specifically shown our invention as applied to an automobile, it is to be understood that we recognize other devices in which it may be incorporated to advantage. In any machine where it is desirvantable to prevent a reversal of the power shaft when power is not applied thereto or to prevent a power shaft from being rotated faster than power is being delivered thereto, this invention may be adopted to advantage.

In Figures 6 and 7 a modified form is shown in which the driving shaft 100 and the driven shaft 101 are not co-axial but are parallel. The shaft 100 is provided with a threaded portion 50 which engages the friction plate nut 12 having an annular friction flange 55. The flange 55 engages either of the clutch rings 113 or 114 to clamp them to their respective friction plates 115 or 116. The friction plates are respectively provided with an integral pinion 117 and 118 and these pinions respectively mesh with gears 119 and 120 secured to the shaft 101. Pinions 117 and 118 are rotatably mounted on the shaft 100.

The clutch rings 113 and 114 are each provided with gear teeth meshing with the pinions 121 and 122 respectively. Pinions 121 and 122 are each carried by arms 123 and 124, respectively, pivotally mounted at 125 in the casing 126. Thus the arms may swing about their respective pivots and carry the pinions 121 and 122 into or out of engagement with dogs 130 and 131, respectively.

The dogs are each carried from the casing 126 by brackets 132 and 133 and the arms are limited in their movements away from their respective dogs by stops 134 and 135 engaging lugs 136 and 137 on the casing. Nut 12 is always engaged with the discs 115 and 116 by lugs 138 and 139 which prevent relative rotation but allow relative axial movement between the nut 12 and discs.

The principle of operation of the modified form just described is much the same as that disclosed in Figures 1 to 4, inclusive. Rotation of the shaft 100 will through the threads 50 cause the nut 12 to engage either of the clutch rings 113 or 114 according to the direction in which shaft 100 is rotated. If it is rotated in the direction of the arrow A, then the nut 12 will through the ring 113 engage the plate 115 which will then be rotated in the same direction with the shaft 100. Pinion 117, being integral with plate 115, will be rotated therewith and cause gear 119 to rotate shaft 101 in the direction of arrow C.

If the shaft 100 is idle and shaft 101 tends to rotate it reversely to the direction above indicated, then the teeth on clutch ring 113 will carry the pinion 121 (see Fig. 7) back into contact with the dog 130 which will engage between the teeth of pinion 121 and prevent its rotation. This pinion will in turn prevent the clutch ring 113 from rotating and thereby through nut 12 hold the shaft 100 stationary, and through plate 115 hold the shaft 101 also stationary.

If the shaft 100 is rotated in the direction B, the nut 12 will engage the clutch ring 114 with the plate 116 and through pinion 118 and gear 120 rotate the shaft 101 in the direction D. Shaft 101 cannot reverse this action since the clutch ring 114 will be held stationary when the pinion 122 engages the dog 131 in the same manner as the pinion 121 engages the dog 130.

Should the shaft 101 for any reason tend to overrun the shaft 100 then the nut will be disengaged from one of the clutch rings and engaged with the other to act as a brake permitting the shaft 100 to rotate at the speed determined by the source of power delivered to shaft 100.

Figure 8 shows another modified form of the present invention. This modification is similar to the design first described in that the driving shaft and driven shaft are axially aligned. The driving shaft 150 is provided with a bearing 151 in the casing 152 and has at its inner end a thread 153 engaging the nut 154. Nut 154 is slidably and rotatably journaled in the casing at 155 and is provided with a splined hub engageable with a driven shaft not shown.

Extending radially of the nut is a clutch disc 156 having leather facings 157 engageable with friction discs 158 and 159. Discs 158 and 159 are each provided respectively with integral gears 160 and 161 which mesh with pinions 162 and 163 carried by arms 164 and 165. Arms 164 and 165 are respectively pivoted to the casing 152 at 166 and 167. The pinions 162 and 163 are prevented from rotating in a manner similar to and under similar conditions as the pinions 121 and 122 in Figures 6 and 7. In this modification, the nut carries the friction facing and the friction discs directly engage the shaft locking mechanism which operates in exactly the same way as that shown in Figures 6 and 7 and will not therefore be particularly described.

Referring now to Figures 1 to 4, inclusive, the shaft 10 is provided with an enlarged end 51 which is positioned between the end 54 of shaft 11 and annular shoulder 53 thus confining the thrusts caused by the nut 12 to the rotating parts. In Figure 6, the thrusts are all dissipated in the casing, while in Figure 8, the thrusts are again transmitted to the casing. The first disclosure is therefore preferable since there are no appreciable losses of power in friction.

By merely changing the direction in which the dogs act, the power input and output direction may be changed.

Figure 9:
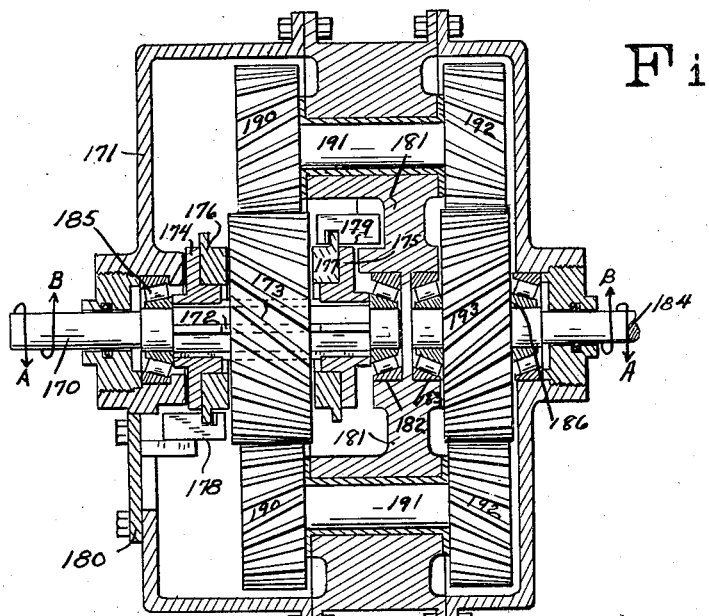
Fig. 9 is a sectional view of a further modification.

Fig. 9 shows a device in which the clutches or locking dogs are rendered operative through the axial movement of a spiral gear caused by side thrust on the teeth. The input shaft 170 is journaled in the casing 171 and is provided with an enlarged end 172 to which the spiral gear 173 is slidably splined. Secured to the enlarged end 172 is a pair of clutch or friction plates 174 and 175 which are respectively engageable by clutch or friction rings 176 and 177. The clutch rings cooperate with the dogs 178 and 179 in the same manner as that noted in the previously described devices. That is ring 176 may freely rotate in the direction indicated by arrow B but will be held against rotation in the opposite direction by dog 178. Ring 177 may freely rotate in the direction indicated by arrow A but will be held against rotation in the opposite direction by dog 179. Dog 178 is carried by the plate 180 upon the casing 171 and dog 179 is carried by the web 181 constituting an inner wall of the casing. This web provides thrust bearings 182 for the input shaft 170 and thrust bearings 183 for the output shaft 184.

Shaft 170 is provided with a thrust bearing 185 and shaft 184 is provided with a thrust bearing 186. The spiral gear 173 meshes with similar pinions 190 secured to stub shafts 191 to which are also secured spiral pinions 192. The stub shafts are journaled in the web 181 and the pinions 192 mesh with spiral gear 193 secured to shaft 184.

As illustrated, it is preferable to oppose the thrust of the gears 193 and 192 against the thrust of gears 173 and 190. The thrust caused between the gear 173 and pinions 190 is due to the angle of the teeth and the direction in which this thrust tends to move gear 173 along the shaft portion 170 depends upon the direction in which the shaft 170 is rotated. Assuming that the shaft 170 is rotated in the direction indicated by the arrow A then gear 173 will be caused to move axially towards the clutch ring 177 and force it into contact with the clutch plate 175. The gear 173 will then be caused to rotate with the shaft 170 and in turn rotate pinions 190. Pinions 190 will through shafts 191 rotate pinions 192 which will through gears 193 cause shaft 184 to rotate in the direction of arrow A. On the other hand, if the shaft 170 is rotated in the direction indicated by the arrow B, the gear 173 will be thrust against the clutch ring 176 and bind the latter to the clutch plate 174. Gear 173 will, through pinions 190, shafts 191, pinions 192, and gear 183, then rotate the shaft 184 in the direction indicated by the arrow B.

It is understood, of course, that the shaft 184 cannot rotate in either direction if the shaft 170 is idle, this effect being produced by the dogs 178 and 179 in co-operation with the rings 176 and 177. Also the shaft 184 cannot cause the shaft 170 to rotate faster than power is delivered to it since an appropriate clutch would be rendered operative to retard such excessive speed.

Figure 10:
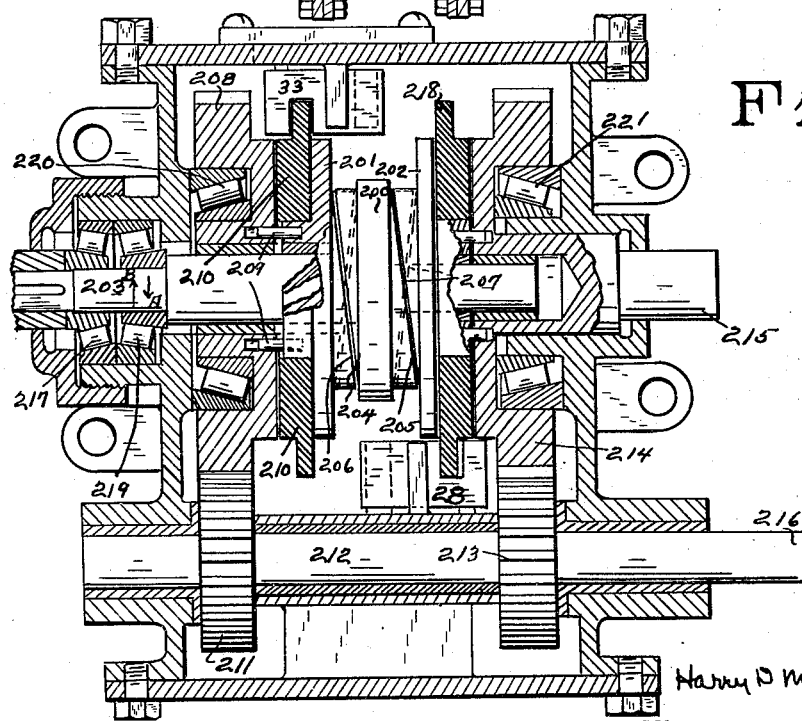
Fig. 10 is a sectional view of another modification.

Fig. 10 shows a modification in which wedge members or cams 200, 201 and 202 replace the screw threads 50 and nut 12 (Fig. 1) and the spiral gear 173 and pinion 190 (Fig. 9). The general principle is, however, the same but is so utilized that several power take offs may be provided in addition to a direct line drive. The wedge 200 is secured to the input shaft 203 and is provided with cam faces 204 upon one side and cam faces 205 upon the other side. Cam faces 204 coact with cam faces 206 on the member 201 and cam faces 205 coact with cam faces 207 on the member 202.

Wedge member 201 is movable axially relative to the gear 208 but is held against rotative movement by the pins 209. Upon movement of the member 201 toward the gear 208, the clutch ring 210 will be gripped between these members. Gear 208 meshes with pinion 211 on stub shaft 212 which carries pinion 213 engaging the gear 214 secured to the output shaft 215. Stub shaft 212 may be extended to provide an output end 216.

Assuming that shaft 203 is rotating in the direction of arrow A, the cam faces 204 on wedge member 200 will engage the cam faces 206 on wedge member 201. Wedge member 200 is held against axial movement toward the right of Fig. 10 by means of the thrust bearing 217. Consequently any further rotation of the member 200 relative to member 201, after engagement of cam faces 204 and 206, will cause the member 201 to bind the clutch ring 210 against the gear 208 and to rotate the gear with shaft 203. The rotation of gear 203 will, through pinion 211, shaft 212, and pinion 213, cause the gear 214 to rotate in the same direction. Shaft 215 being secured to gear 214 will rotate therewith.

If the shaft 203 is rotated in the direction indicated by arrow B, the cam faces 204 and 206 will be disengaged and the cam faces 205 and 207 will be engaged. As a result the member 202 will bind the clutch ring 218 to the gear 214 and further rotation of shaft 203 will be transmitted direct to the shaft 215. The thrust of shaft 203 caused by the engagement of members 200 and 202 will be taken up in the bearing 219. Likewise gears 208 and 214 are respectively provided with thrust bearings 220 and 221.

As was found in Figs. 1 to 4, inclusive, the dog 33 in Fig. 10 prevents the clutch ring 210 from rotating in the direction of the arrow B but permits it to rotate in the direction of arrow A and the dog 28 prevents the clutch ring 218 from rotating in the direction of arrow A but permits it to rotate in the direction of arrow B. Consequently if the shaft 215 rotates in either direction and if the shaft 203 offers a resistance to such rotation, one or the other of the clutch rings will be engaged by its associated wedge members 201, 202 and held against rotation by its clutch dog. Thus the shaft 215 will be held stationary unless the shaft 203 is rotated.

We claim:

1. The combination with a pair of shafts, of a threaded portion on one of said shafts, a nut on said threaded portion having a friction flange, a pair of friction plates secured to the other of said shafts in spaced relation to each other and having said nut disposed between them, said plates and nut having interlocking shoulders permitting lateral movement between the nut and the plates, friction rings disposed between said friction flange and friction plates, and means preventing rotation of said rings in one direction while permitting rotation thereof in the opposite direction, said rings being rotatable opposite to each other.

2. The combination with a pair of shafts, of a threaded portion on one of said shafts, a nut on said threaded portion having a friction flange, a pair of friction plates secured to the other of said shafts in spaced relation to each other and having said nut disposed between them, said plates and nut having interlocking shoulders permitting lateral movement between the nut and the plates, friction rings disposed between said friction flange and friction plates, and means preventing rotation of said rings in one direction while permitting rotation thereof in the opposite direction, said rings being rotatable opposite to each other, said means including a clutch flange on each of said rings and dogs engageable with said clutch flanges in one direction.

3. The combination with a pair of shafts, of a threaded portion on one of said shafts, a nut on said threaded portion having a friction flange, a pair of friction plates secured to the other of said shafts, in spaced relation to each other and engageable by said flange, said flange being disposed between said plates, interlocking shoulders between said nut and plates permitting relative lateral movement, and means preventing rotation of said plates in one direction as determined by the engagement of said flange therewith, said rings being rotatable opposite to each other.

4. In a power transmitting and braking device having a driving shaft provided with a threaded portion, a nut engaging said threaded portion for axial movement thereon, a pair of friction plates rotatable about the axis of said shaft and disposed upon opposite sides of said nut for frictional engagement therewith, and means securing said plates together against relative axial movement and engaging said nut for preventing rotation thereof relative to said plates but permitting axial movement thereof relative to said plates.

5. In a power transmitting and braking device having a driving shaft provided with a threaded portion, a nut engaging said threaded portion for axial movement thereon, a pair of friction plates rotatable about the axis of said shaft and disposed upon opposite sides of said nut for frictional engagement therewith, means securing said plates together against relative axial movement and engaging said nut for preventing rotation thereof relative to said plates but permitting axial movement thereof relative to said plates, and means between said shaft and plates permitting relative rotation thereof but preventing relative axial movement thereof.

6. In a power transmitting and braking device having a driving shaft provided with a threaded portion, a nut engaging said threaded portion for axial movement thereon, a driven shaft, friction plates secured thereto and disposed upon opposite sides of said nut, said nut being confined against rotation relative to said plates.

7. In a power transmitting and braking device having a driving shaft provided with a threaded portion, a nut engaging said threaded portion for axial movement thereon, a friction plate disposed upon each side of said nut, and bolts passing through said plates and nut securing the plates against relative separation and permitting axial movement of said nut.

HARRY D. MULLAN.
C. W. TINGLEY.